United States Patent [19]

Tsuchiya

[11] Patent Number: 4,707,919

[45] Date of Patent: Nov. 24, 1987

[54] FLEXIBLE LINE CUTTING APPARATUS

[76] Inventor: William S. Tsuchiya, 1800-7th St., East Moline, Ill. 61244

[21] Appl. No.: 205,300

[22] Filed: Nov. 10, 1980

Related U.S. Application Data

[63] Continuation of Ser. No. 632,972, Nov. 18, 1975, abandoned.

[51] Int. Cl.[4] .............................................. B26B 27/00
[52] U.S. Cl. ....................................... 30/276; 56/12.7
[58] Field of Search ....................... 56/12.7, 295, 17.5, 56/16.9; 226/127, 193, 181; 30/276, 347

[56] References Cited

U.S. PATENT DOCUMENTS

| | | | |
|---|---|---|---|
| 906,110 | 12/1908 | Covington | 226/127 |
| 2,817,205 | 12/1957 | Muller | 56/16.9 |
| 3,664,102 | 5/1972 | Reber | 56/12.7 |
| 3,824,371 | 7/1974 | Schurman, Jr. | 226/12.7 |
| 3,928,911 | 12/1975 | Pittinger | 56/12.7 |

Primary Examiner—Paul J. Hirsch

Attorney, Agent, or Firm—Trexler, Bushnell, Giangiorgi & Blackstone, Ltd.

[57] ABSTRACT

Apparatus for cutting vegetation and the like wherein a flexible line serves as the cutting element, the apparatus including a cutting head rotatably supported in a housing and having a passageway formed therein extending between a first opening intersected by the axis of rotation of the head, to a second opening on the outer periphery of the head. A coiled supply of line is contained in the housing and is secured against rotation with the cutting head. One end of the line extends from the coil into the cutting head through the opening intersected by the axis of rotation, through the passageway, and out through the opening on the periphery of the head to a free traveling cutting end portion. The line in the passageway is free to rotate about its own axis as the head rotates relative to the housing. A feed device is provided on the housing for selectively feeding additional line from the coiled supply through the cutting head, to renew the free traveling cutting end portion of the line.

36 Claims, 9 Drawing Figures

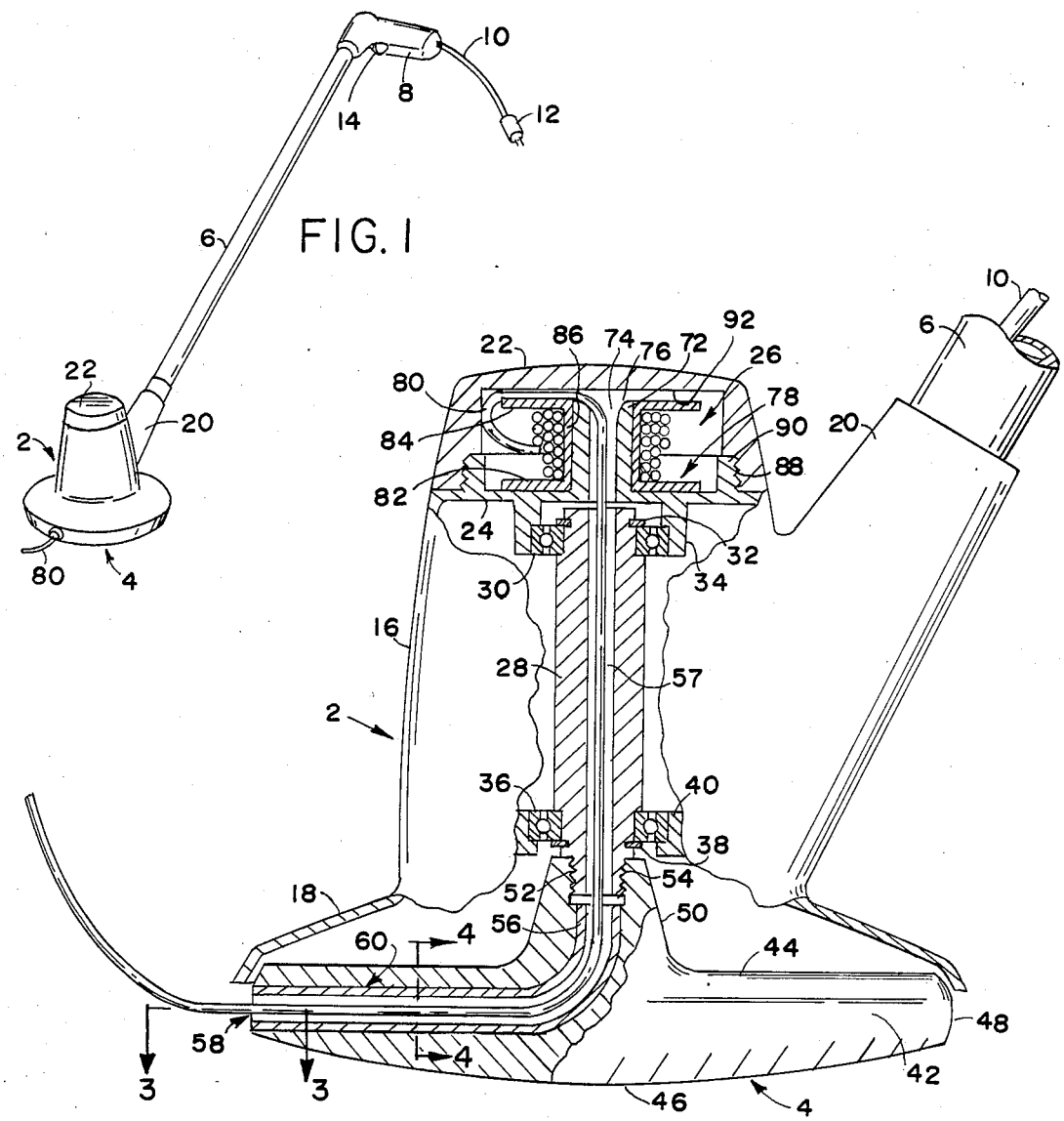
FIG. 1
FIG. 2
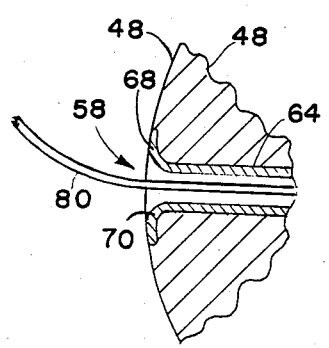
FIG. 3
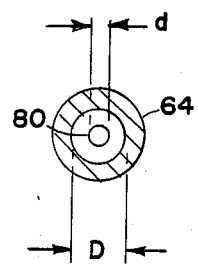
FIG. 4
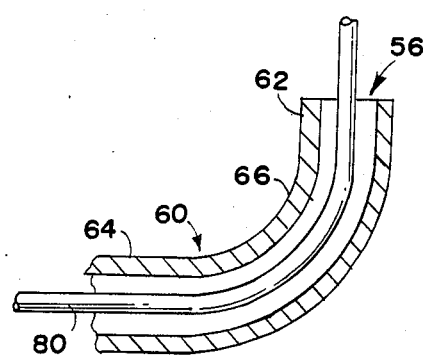
FIG. 5

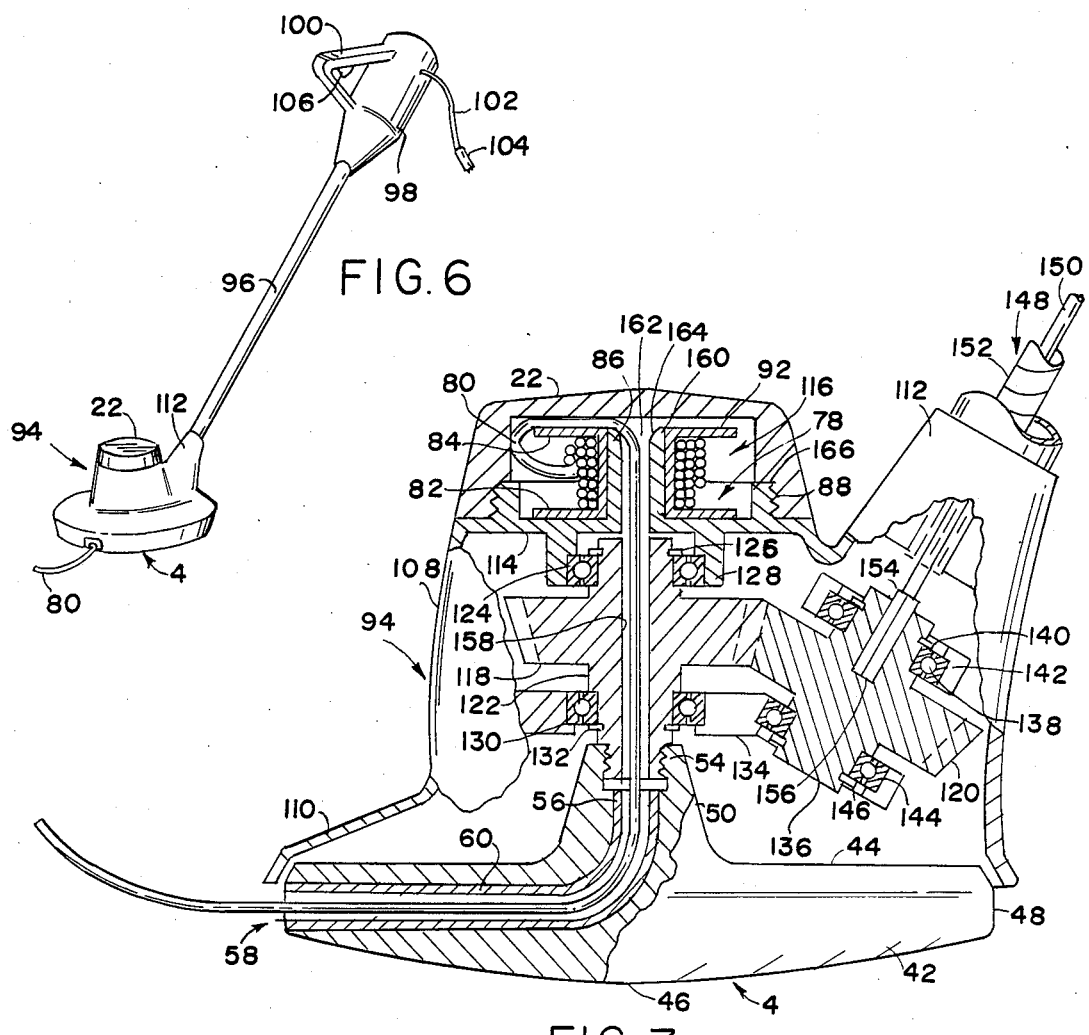
FIG. 6
FIG. 7
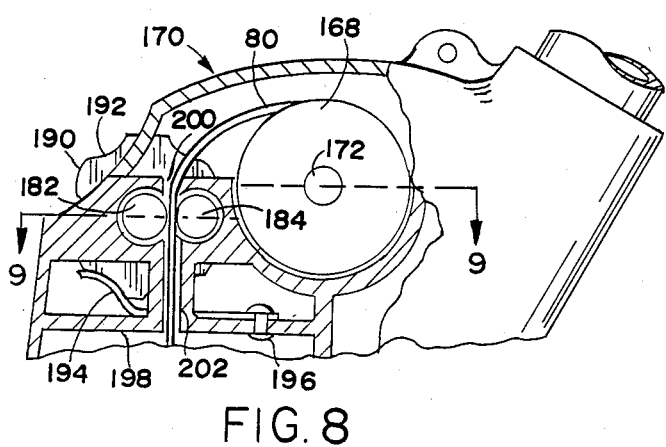
FIG. 8
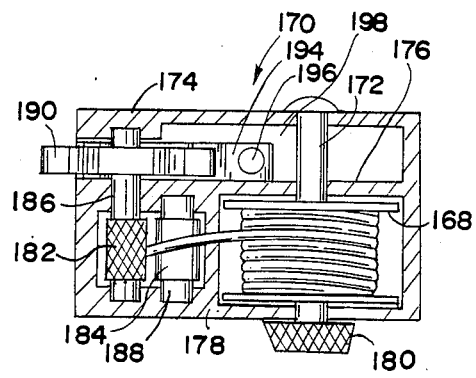
FIG. 9

FLEXIBLE LINE CUTTING APPARATUS

This is a continuation of application Ser. No. 632,972, filed Nov. 18, 1975, now abandoned.

BACKGROUND OF THE INVENTION

The present invention relates generally to vegetation cutting devices and more particularly to such devices wherein flexible line means are employed as the cutting element.

Vegetation cutting devices which use a flexible line as the cutting element are known in the prior art and are exemplified by those devices disclosed in U.S. Pat. Nos. 3,664,102 issued to Reber, and 3,708,967 issued to Giest et al; and West German petty Pat. Nos. 6,919,841; 6,919,842; 6,919,843; and 6,919,844. Such devices possess a significant safety advantage over more conventional, metal blade type cutting apparatus, in that the flexible cutting line is sufficiently resilient so as not to propel rocks and other objects at dangerous velocities during operation, nor cause serious bodily injury if it should directly contact the operator or bystanders. On the other hand, the line is sufficiently rigid, when rotated at operating speed, to efficiently cut weeds, grass, and other vegetation.

A device of the foregoing type which has heretofore been commercially available comprises a rotary driven cutting head having a spool of nylon monofilament line contained concentrically therein for rotation therewith. One end of the line on the spool extends outwardly through a peripheral opening in the head to a free traveling cutting end portion. When the cutting end portion has deteriorated as a result of extended use, additional line can be unwound from the spool to renew the cutting portion. Since the spool is contained in the rotary head, it is necessary, in preparation for replacing the spool or unwinding additional line therefrom, to stop the head, invert the entire apparatus, and loosen a retaining member on the underside of the head to gain access to the spool compartment.

SUMMARY OF THE INVENTION

It is the primary object of the present invention to provide an improved vegetation cutting apparatus of the type using a flexible line as the cutting element. More particularly, it is an object to provide such apparatus having improved cutting line reliability and wear characteristics. It is a further object to provide such a device wherein the cutting action of the flexible line is more aggressive for a given head rotational velocity than is the case with devices heretofore known, without sacrificing any safety advantages which result from the resiliency of the line. It is yet a further object to provide such a device which is so constructed as to provide improved, convenient means for renewing the cutting end portion of the line. It is an additional object of the invention to provide such a device wherein the rotary cutting head is of a substantially lighter construction than heretofore known, with a resulting decrease in the undesirable gyroscopic effect of the head used on cutting devices heretofore known. It is another object to provide such a device wherein the rotary cutting head is substantially simpler in design and construction and more economical to manufacture than those on such devices heretofore known.

In pursuance of these and other objects, the invention comprises, generally, a housing; a cutting head member supported on the housing for rotation about an axis normal to a cutting plane; means forming a smooth, continuous passageway in the head extending from a first opening intersected by said axis to a second opening intersected by said cutting plane; and a flexible line extending through the passageway and including a first portion extending outwardly from the first opening and secured to the housing against rotation with the head, and a second, free traveling end portion extending in an unsupported fashion outwardly from said second opening, the line being free to rotate about its own axis within the passageway as the head is rotated relative to the housing. In one embodiment of the invention, the cutting head member is connected to the lower end of the shaft of an electric motor contained in the housing, for rotation therewith. The motor shaft is hollow and the flexible line extends downwardly through the shaft and into the passageway in the head, from a supply spool mounted on the housing above the motor. In another embodiment, the head is connected to the lower end of a hollow shaft which is gear driven from a remote power source. As in the first embodiment, the line extends downwardly through the gear driven hollow shaft from a spool supply contained in the housing directly above the head. The passageway in the head may be formed of a metal tube, and the cutting line is preferably composed of monofilament nylon which, in addition to its favorable resiliency characteristics and cutting properties, also possesses favorable bearing properties for its rotation within the metal tubular passageway in the head.

It will be apparent from the foregoing summary of the invention that for each revolution of the cutting head relative to the housing, that portion of the line in the passageway in the head and the contiguous free traveling end portion is caused to rotate once about its own axis. This line rotation, which is the source of many of the advantages which the present invention enjoys over the prior art, results from the fact that the opposite end of the line is held stationary while the head rotates, and the fact that the line is free to rotate about its own axis within the passageway in the head. The resistance of the line to twisting about its own axis causes the line to rotate about its axis as the head rotates. It has been found that monofilament nylon line possesses the requisite resistance to twisting so that it rotates rather than twists about its own axis, and that it additionally possesses the requisite degree of flexibility and rigidity which results in a safe yet effective cutting action.

The aforedescribed rotation of the cutting end portion of the line during operation of the vegetation cutting apparatus of the present invention results in a number of advantages over prior art flexible line cutting devices, included among which are improved line reliability and wear characteristics. Since the line continually rotates, the leading, or cutting surface continually changes in operation so that the wear is evenly distributed around the entire periphery of the line. In addition, the stresses which occur in the line during operation, and the wear which normally occurs at the point where the line exits from the cutting head, are likewise evenly distributed about the periphery of the line. In all flexible line cutting devices heretofore known, the cutting line does not rotate about its own axis but instead maintains a constant position relative to the cutting head so that the wear and stresses mentioned above always occur at the same points in the line, until the cutting end portion is renewed. It will be apparent that the cutting line of a device constructed in accordance with the teachings of the present invention will experience less wear and breakage and thus last longer in use than the cutting line in a conventional flexible line cutting device.

Another advantage which results from the line rotation is that of more aggressive cutting action for a given head rotational velocity, as compared to presently known flexible line cutting devices. Such increased aggressiveness is a result of the rotational component of velocity of the cutting end of the line.

Since the supply portion of the line is stored in the housing and remains stationary as the cutting head rotates, it is possible to provide means on the housing to engage the stationary line and feed additional line from the supply portion into the head to renew the cutting end portion when required. This eliminates the necessity, which exists with respect to presently available flexible line cutting devices, of manipulating a line feeding means on the cutting head to perform this task. This is a particularly significant advantage with respect to larger vegetation cutting devices wherein accessibility to the cutting head is restricted.

Yet another advantage possessed by the present invention over flexible line cutting devices heretofore known resides in the fact that, since the cutting line supply is contained in the housing rather than the cutting head, the rotating mass of the head is significantly reduced, resulting in a decrease in the gyroscopic tendencies of the head. This, in turn, results in easier handling of the cutting device.

BRIEF DESCRIPTION OF THE DRAWINGS

The preferred embodiments of the invention will be described in conjunction with the accompanying drawings in which:

FIG. 1 is an overall perspective view of one embodiment of the invention;

FIG. 2 is an enlarged, elevational view of the lower end of the device shown in FIG. 1, with portions broken away for the sake of clarity;

FIG. 3 is a fragmentary sectional view taken along the line 3—3 of FIG. 2;

FIG. 4 is an enlarged sectional view taken along the line 4—4 of FIG. 2;

FIG. 5 is an enlarged view of a portion of the device shown in FIG. 2;

FIG. 6 is an overall perspective view of another embodiment of the invention;

FIG. 7 is an enlarged, elevational view of the lower end of the device shown in FIG. 6, with portions broken away for the sake of clarity;

FIG. 8 is a fragmentary elevational view of another form of a portion of the invention, with portions broken away; and FIG. 9 is a sectional view taken generally along the line 9—9 of FIG. 8.

DESCRIPTION OF THE PREFERRED EMBODIMENTS

Referring first to FIG. 1 of the drawings, the embodiment of the invention illustrated therein comprises, generally, a housing 2 containing an electric motor, a circular cutting head member 4 supported for rotation at the lower end of the housing 2, an elongated, tubular handle portion 6 affixed to and extending upwardly and rearwardly from the housing 2, and a hand-engaging grip member 8 on the upper end of the handle portion 6.

The electric motor in the housing 2 is connected to a source of electric current by means of a power cord 10 which extends from the motor upwardly through the tubular handle portion 6, and out through the end of the grip member 8. An electrical plug 12 is contained on the end of the cord 10 for connection to an extension power cord (not shown). An electrical switch 14 in the form of a finger operated trigger is contained in the grip member 8 for turning the motor in the housing 2 on and off.

An enlarged, elevational view of the housing 2 and cutting head 4 is shown in FIG. 2, wherein certain portions are broken away for the sake of clarity. The housing 2 is preferably formed of a moldable, high impact plastic or other suitable material, and comprises, generally, a relatively thin walled, barrel shaped portion 16 which contains the electric motor, a flared skirt portion 18 formed integrally with and encircling the lower end of the barrel shaped portion 16, and an upwardly and rearwardly extending projection 20 integral with the rear of the barrel shaped portion 16 and adapted for fixedly receiving the lower end of the tubular handle portion 6. A circular cap 22 threadably received on the upper end of the housing portion 16 defined, in conjunction with an end closure member 24 on the upper end of the barrel shaped portion 16 of the housing, a substantially annular cutting line storage chamber 26, as will be described hereinafter in greater detail.

The electric motor contained within the barrel shaped portion 16 of the housing 2 includes a hollow shaft 28 supported at its upper and lower ends in the housing for rotation about a vertical axis. The upper end of the shaft 28 is supported by a ball bearing 30 which is retained by means of a shoulder formed in the shaft and a spring retaining ring 32 seated in a groove in the circumference of the shaft. The bearing 30 is, in turn, supported in an annular member 34 which is formed integrally with and extends downwardly from the end closure member 24. The lower end of the shaft 28 is supported by a ball bearing 36 which is retained thereon by means of a shoulder formed in the shaft and a spring retaining ring 38 seated in a groove in the circumference of the shaft. The bearing 36 is, in turn, supported in a recess in a member 40 which is formed integrally with the sides of the barrel shaped portion 16 of the housing 2.

Secured to the lower end of the hollow shaft 28 for rotation therewith in a plane normal to the axis of the shaft is the cutting head member 4, which comprises, generally, a circular, or disk shaped portion 42 defined by a generally flat, horizontal upper surface 44, a convex, ground engaging lower surface 46, and a generally cylindrical, vertical outer wall 48 connecting the upper and lower surfaces 44 and 46, respectively, and a truncated conical portion 50 formed integrally and concentrically with the disk shaped portion 42 and extending upwardly therefrom. The cutting head 4, like the housing 2, may be formed of a moldable, high impact plastic or other suitable material. The cutting head member 4 is secured to the shaft 28 by means of threads formed on the lower end of the shaft at 52 which are engaged by mating threads 54 formed in an aperture 56 in the upper end of the truncated conical portion 50 of the cutting head member 4.

As is apparent from the drawing, the aperture or opening 56 in the upper end of the cutting head member 4 is concentric with and intersected by the axis of rotation of the shaft 28, and communicates with the lower end of the bore 57 in the shaft 28. The opening 56 communicates with a second opening 58 in the peripheral wall 48 of the portion 42 and intersected by a plane normal to the axis of the shaft 28 and cutting head 4, by means of a continuous passageway defined by a tubular member 60. The tubular member 60 includes a vertical inner end portion 62 concentric with the axis of the shaft 28 and cutting head 4 and terminating at its upper end at the opening 56, a horizontal, radially extending portion 64, the outer end of which terminates at the opening 58 in the wall 48, and a smoothly curved portion 66 which connects the vertical portion 62 with the horizontal portion 64. The tubular member 60 is preferably formed of metal and may be molded in or otherwise rigidly secured in the cutting head 4. As shown in FIG. 3 of the drawings, the outer end of the horizontal portion 64 of the tube 60 is flared and rounded in the horizontal plane on either side of the opening 58, at 68 and 70.

Referring again to FIG. 2 of the drawings, it will be seen that the end closure member 24 of the housing 2 includes a vertically extending, cylindrical projection 72 formed integrally and disposed concentrically therewith. The projection 72 has a vertical bore 74 which communicates at its lower end with the upper end of the bore 57 in the shaft 28 of the electric motor, the bore 74 having a rounded, flared upper end at 76. Seated on the projection 72 is a spool 78 having a coiled supply of flexible cutting line 80 contained thereon. The spool 78 is comprised of a lower flange 82, an upper flange 84, and a cylindrical, hollow core 86 which receives the projection 72. As is apparent from the drawings, the lower flange 82 is seated on the top surface of the end closure member 24 of the housing 2. The cap 22 is threaded at 88 to engage mating threads formed in an annular vertical member 90 formed integrally with and extending vertically from the member 24. When in place on the upper end of the housing 2, the cap 22 encloses and partially defines the annular chamber 26 containing the spool 78 and coiled supply of cutting line 80.

The cutting line 80, which is preferably composed of monofilament nylon but may be composed of any other suitable flexible material, extends from the coiled portion on the spool 78, over the top of the upper flange 84 of the spool, downwardly through the bores 74 and 57 in the projection 72 and shaft 28, respectively, through the first opening 56 in the center of the cutting member 4, through the passageway defined by the tube 60, and outwardly through the second opening 58 on the peripheral wall 48 of the cutting head, and terminates with an unsupported, free traveling end portion. As shown in FIG. 2, the upper end of the line 80 is secured to the housing and against rotation with the cutting head by means of the cap 22, the inner surface 92 of which engages the line and clamps it securely against the upper flange 84 of the spool 78, when the cap is tightened in place.

In operation, the motor shaft 28 and cutting head member 4 rotate relative to the housing 2, the coiled supply of line 80 in the upper end of the housing remains fixed to the housing against rotation with the shaft and cutting head, and that portion of the line 80 which extends outwardly through the passageway defined by the tubular member 60 in the cutting head 4 and terminates with a free traveling end portion, rotates with the cutting head. Since the line 80 resists twisting about its own axis, and since it is free to rotate about its axis within the passageway defined by the tube 60, the line is caused to rotate about its axis as the cutting head rotates. It is obviously important to proper operation of applicant's device that the cutting line 80 be free to rotate within the passageway in the cutting head. Applicant has found that for a monofilament nylon line having a diameter d of approximately 0.060 inches, a tubular member 60 having an inside diameter D of approximately 0.200 inches and a smooth interior wall is adequate to assure free rotation of the line. However, it is clear that other line and tube diameters can be employed with equally successful results.

For every revolution of the cutting head member 4 about its axis relative to the housing, the cutting line 80 in the head is caused to rotate one revolution about its own axis. That portion of the line 80 which extends downwardly through the bore 57 in the shaft 28 and through the vertical upper end portion 62 of the tube 60 in the head 4 does not rotate about its own axis, but instead remains fixed with respect to the housing 2 like the coiled supply portion of the line. However, such rotation begins with that portion of the line 80 that extends through the curved portion 66 of the tube 60. Because of the relative motion which exists between the line 80 and the wall of the bore 57 in the shaft 28 and the interior wall of the tube 60, it is necessary, to minimize wear of the line, to construct the wall of the bore 57 and the interior wall of the tube 60 as smoothly as possible. If these surfaces are smooth, and if the line 80 is composed of monofilament nylon or other wear resistant material, minimal wear occurs as a result of such relative motion during operation of the device.

Applicant has found that a rotational velocity of the cutting head member 4 of approximately 3500 revolutions per minute results in effective cutting action of the line 80, but obviously this rotational velocity can be altered as necessary to provide optimum cutting effectiveness for any particular structure constructed in accordance with the teachings of the invention. It is obvious, for example, that the optimum rotational velocity for any particular structure will vary with numerous factors, including the diameter of the cutting head, the diameter of the line, and the particular type of vegetation being cut.

A second embodiment of the invention is illustrated in FIGS. 6 and 7 of the drawings. Although this embodiment is identical in many respects with the enbodiment shown in FIGS. 1-5, it differs in that the power source for rotating the cutting head member is not contained in the housing immediately above the head but is instead mounted on the upper end of the elongated handle portion and is drivingly connected to the head by means of a power shaft and gear train.

Referring to FIG. 6, the embodiment of the invention illustrated therein comprises, generally, a housing 94, a circular cutting head member 4 identical in construction to the cutting head member on the embodiment illustrated in FIGS. 1-5, and supported for rotation at the lower end of the housing 94, an elongated, tubular handle portion 96 affixed to and extending upwardly and rearwardly from the housing 94, an electric motor 98 on the upper end of the handle portion 96, and a handle member 100 connected to the housing for the motor 98. A power cord 102 extends from the motor housing and has an electrical plug 104 on its end for connection to an extension power cord (not shown). An electrical switch 106 in the form of a finger operated trigger is contained in the handle 100 for turning the motor 98 on and off. It should be appreciated that a gasoline engine or other suitable power source could be substituted for the motor 98.

An enlarged elevational view of the housing 94 and cutting head 4 is shown in FIG. 7. Since the cutting head 4 in the embodiment shown in FIG. 7 is identical to the cutting head in the embodiment shown in FIGS. 1-5, the same reference numbers are used to identify the component parts of the cutting head in FIG. 7 as are used in FIGS. 1-5, and reference is made to the description of the cutting head heretofore given. In addition, the spool 78 of line 80 and the cap 22 on the top of the housing 94 are identical to those illustrated in the embodiment shown in FIGS. 1-5 and already described, and the same reference numbers are thus used for these elements in FIGS. 6 and 7 as are used in FIGS. 1-5, and reference is made to the description of these elements heretofore given.

The housing 94 is preferably formed of a moldable, high impact plastic or other suitable material, and comprises, generally, a relatively thin walled, barrel shaped portion 108, a flared skirt portion 110 formed integrally with and encircling the lower end of the barrel shaped portion 108, and an upwardly and rearwardly extending projection 112 integral with the rear of the barrel shaped portion 108 and adapted for fixedly receiving the lower end of the tubular handle portion 96. A circular cap 22 threadably received on the upper end of the housing portion 108 defines, in conjunction with an end closure member 114 on the upper end of the barrel shaped portion 108 of the housing, a substantially annular, cutting line storage chamber 116.

Supported for rotation within the housing 94 are a pair of meshing bevel gears 118 and 120. The gear 118 includes a hollow shaft portion 122 supported at its upper and lower ends in the housing for rotation about a vertical axis. The upper end of the shaft portion 122 is supported in a ball bearing 124 which is retained by means of a shoulder formed in the shaft portion and a spring retaining ring 126 seated in a groove in the circumference of the shaft portion. The bearing 124 is, in turn, supported in an annular member 128 which is formed integrally with and extends downwardly from the end closure member 114. The lower end of the shaft portion 122 is supported by a ball bearing 130 which is retained thereon by means of a shoulder formed in the shaft portion and a spring retaining ring 132 seated in a groove in the circumference of the shaft. The bearing 130 is, in turn, supported in a recess in a member 134 which is formed integrally with the sides of the barrel shaped portion 108 of the housing 94.

The gear 120 includes a shaft portion 136 supported at its upper and lower ends in the housing 94 for rotation about an inclined axis. The upper end of the shaft portion 136 is supported in a ball bearing 138 which is retained by means of a shoulder formed in the shaft portion and a spring retaining ring 140 seated in a groove in the circumference of the shaft portion. The bearing 138 is, in turn, supported in a recess in a member 142 which is formed integrally with the sides of the projection 112. The lower end of the shaft portion 136 is supported in a ball bearing 144 which is retained thereon by means of a shoulder formed in the shaft portion and a spring retaining ring 146 seated in a groove in the circumference of the shaft. The bearing 144 is, in turn, supported in a recess in the member 134.

Secured to the lower end of the shaft portion 122 of the gear 118 for rotation therewith in a plane normal to the axis of the gear is the cutting head member 4, which has already been described with reference to the embodiment of the invention illustrated in FIGS. 1-5. The opening 56 in the upper end of the cutting head member is concentric with and intersected by the axis of rotation of the gear 118, and communicates with the lower end of the bore 158 in the center of the gear 118.

The gear 120 is driven from the electric motor 98 on the upper end of the handle portion 96 by means of a flexible drive shaft 148 which extends through the hollow handle portion 96. The flexible drive shaft 148 includes a shaft member 150 which is rotatably supported within a flexible housing 152. The lower end of the housing 152 is fixed against rotation in the projection 112 of the housing 94, and a square cross sectioned lower end portion 154 of the shaft 150 is received in a square cross sectioned hole 156 in the center of the gear 120, to drivingly connect the shaft to the gear. The upper end of the shaft 150 is drivingly connected to the shaft of the motor 98 by any conventional means, to complete the driving connection between the motor 98 and the gear 120.

The end closure member 114 of the housing 94 includes a vertically extending cylindrical projection 160 formed integrally and disposed concentrically therewith. The projection 160 has a vertical bore 62 which communicates at its lower end with the upper end of the bore 158 in the gear 118, the bore 162 having a rounded, flared upper end at 164. The spool 78 is seated on the projection 160 and the lower flange thereof rests on the top surface of the end closure member 114. The threads 88 on the cap 22 engage mating threads formed in an annular vertical member 166 formed integrally with and extending vertically from the member 114. When in place on the upper end of the housing 94, the cap 22 encloses and partially defines the annular chamber 116 containing the spool 78 and coiled supply of cutting line 80.

The cutting line 80 in the embodiment of the invention illustrated in FIGS. 6 and 7 of the drawings is secured against rotation with the cutting head member 4 in the same manner previously described with reference to the embodiment illustrated in FIGS. 1-5 of the drawings. The line extends downwardly through the bore 158 in the gear 118 and outwardly through the tube 60 in the cutting head 4, to an unsupported, free traveling end portion. The action of the line 80 during operation of the embodiment illustrated in FIGS. 6 and 7 is identical to that previously described with reference to the embodiment illustrated in FIGS. 1-5.

FIGS. 8 and 9 of the drawings illustrate another means for storing a coiled supply of cutting line on the cutting device of the invention, and means for feeding additional line from the supply when required to renew the cutting end portion of the line. The modification shown in FIGS. 8 and 9 can be adapted to either of the embodiments of the invention heretofore described, in place of the cap 22, spool 78, and related elements.

The modification illustrated in FIGS. 8 and 9 includes a spool 168 supported in a housing 170 which can form the upper end of either the housing 2 of the embodiment illustrated in FIGS. 1-5, or the housing 94 of the embodiment illustrated in FIGS. 6 and 7. The spool is supported for rotation on a pin 172 which in turn is received in the walls 174, 176 and 178 of the housing 170. A nut 180 on one end of the pin 172 is removable to permit removal of the pin from the housing for replacing the spool 168. A pair of rollers 182 and 184 are rotatably supported in the housing forwardly of the spool 168, on shafts 186 and 188, respectively. The roller 182 has a knurled metal surface and the roller 184 has a resilient surface, and the two rollers are spaced apart a distance less than the diameter of the cutting line 80 on the spool 168.

One end of the shaft 186 for the roller 182 has a larger wheel 190 fixed thereto for rotation therewith. The wheel 190 has a series of equally spaced detents 192 formed about its circumference which are engaged by a spring member 194 mounted by means of a rivet 196 on the wall 198 of the housing 170. The forward segment of the wheel 190 extends outwardly through an opening in the wall of the housing 170 and can be rotated manually to drive the roller 182.

A vertical passageway for the cutting line 80 is defined by the walls of the housing 170 both above and below the rollers 182 and 184, at 200 and 202, respectively. The line 80 from the spool 168 extends downwardly through the passageway 200, between the rollers 182 and 184, and through the passageway 202, to the bore in either the motor shaft 28 or the gear 118, depending on which embodiment of the invention the modification is used in conjunction with. The rollers 182 and 184 positively grip the line and feed the same downwardly through the passageway when rotated manually by means of the wheel 190. The holding force of the spring 194 acting on the detents 192 in the wheel 190 is sufficiently strong to hold the line rigid with the housing 170 and against rotation with the cutting head, but the spring force can be overcome by exerting manual force on the wheel 190, to feed additional line into the cutting head.

Although both of the embodiments of the invention illustrated are vegetation trimming devices which can be easily manipulated by hand, it will be appreciated that the principles of the invention can also be applied to other types of vegetation cutting devices, such as, for example, a larger, wheel-supported apparatus adapted for moving lawns. It will further be appreciated that the accessibility of the cutting head member on a device of the latter type will be greatly restricted, due to the inconvenience and difficulty of inverting the apparatus to provide such access. Since the storage portion of the cutting line, according to the principles of the present invention, is contained on the housing rather than in the cutting head, it will be apparent that the invention offers a rather significant advantage in permitting ready access to the cutting line, without the necessity of inverting the entire cutting apparatus.

I claim:

1. Apparatus for cutting vegetation and the like comprising: a member rotatable about an axis normal to a cutting plane; means forming a continuous passageway in said member extending from a first opening intersected by said axis to a radially spaced second, tubular opening intersected by said cutting plane; flexible line means extending through said passageway and including a first end portion extending outwardly from said first opening and secured externally of said member against rotation with said member, and a second, free traveling end portion extending outwardly from said second tubular opening, said line means being confined within said tubular opening and free to rotate about its own axis of elongation within said passageway as said member is rotated.

2. The invention defined in claim 1 wherein said passageway is formed by a tube having a smooth curvature between said first and second openings.

3. The invention defined in claim 2 wherein said line means is composed of monofilament nylon, and wherein said tube has a smooth metallic interior wall.

4. Apparatus for cutting vegetation and the like comprising: an electric motor supported within a housing and including a hollow shaft rotatable about an upright axis; a cutting head member having a ground engaging lower surface and secured to the lower end of said hollow shaft for rotation therewith in a cutting plane normal to the axis of said shaft; means defining a smoothly curved, tubular continuous passageway in said cutting head member above said ground engaging surface and extending from a first opening in communication with the lower end of said hollow shaft and intersected by said upright axis, to a second, radially spaced opening on the periphery of said member and intersected by said cutting plane; flexible line means extending through the center of said hollow shaft and said tubular passageway and including a coiled portion stored on the housing above said electric motor and secured to the housing against rotation with the shaft and cutting head member, and a free traveling end portion extending outwardly from the opening on the periphery of said member, the line means being confined within said tubular passageway and being free to rotate about its own axis within said tubular passageway as said cutting head member rotates relative to said housing.

5. The invention defined in claim 4 wherein the coiled portion of said line means is contained within a compartment in said housing directly above said electric motor, and is disposed substantially concentrically with the axis of said shaft.

6. Apparatus for cutting vegetation and the like comprising: a housing; a hollow shaft supported in said housing for rotation about an axis normal to a cutting plane; means for rotating said hollow shaft relative to said housing; a member secured to one end of said hollow shaft for rotation therewith and having means defining a tubular opening therein spaced radially from said one end of said shaft and intersected by said cutting plane; and flexible line means extending from a storage portion secured to the housing against rotation with said shaft and member, through said hollow shaft and outwardly through said one end thereof, radially outwardly from said shaft and through said tubular opening in said member and terminating with a free traveling end portion externally of said member, the portion of said line means extending through said tubular opening in said member being confined within said opening and free to rotate about its own axis relative to said member as said member rotates relative to said housing.

7. The invention defined in claim 6 wherein said means for rotating said hollow shaft comprises a first gear on said shaft; a second, mating gear supported for rotation on said housing; and power means connected to said second gear for driving the same.

8. Apparatus for cutting vegetation and the like comprising: a housing; a member supported on said housing for rotation about its axis normal to a cutting plane; means defining a first tubular opening in said member intersected by said axis; means defining a second tubular opening in said member spaced radially from said first tubular opening and intersected by said cutting plane; flexible line means extending through said member between said first and second tubular openings and including a first end portion extending through and outwardly from said first tubular opening and a second, free traveling end portion extending through and outwardly from said second tubular opening; and means on the housing for releasably holding the first end portion of said line means rigid with the housing and against rotation with said member, the line means being confined within said second tubular opening and free to rotate about its own axis within the member as the member rotates relative to the housing.

9. Apparatus for cutting vegetation and the like comprising: a housing; hollow shaft means supported in said housing for rotation about an axis normal to a cutting plane; a member secured to one end of said shaft means for rotation therewith and having means defining a tubular opening therein spaced radially from said one end of said shaft means and intersected by said cutting plane; and flexible line means extending from a storage portion secured to the housing against rotation with said shaft means and member, through said hollow shaft means and outwardly through said one end thereof, radially outwardly from said shaft means and through said tubular opening in said member and terminating with a free traveling end portion externally of said member, the portion of said line means extending through said tubular opening in said member being confined within said tubular opening and free to rotate about its own axis relative to said member as said member rotates relative to said housing.

10. The invention defined in claim 9 including means on the housing engaging said storage portion of said line means and selectively operable for feeding line from said storage portion through said hollow shaft means and said member to renew the free traveling end portion of said line means.

11. The invention defined in claim 10 wherein said means on the housing for feeding line from said storage portion comprises at least a pair of opposed rollers, one on each side of and drivingly engaging said storage portion of said line means; and including means selectively operable for rotating at least one of said rollers.

12. The invention defined in claim 11 including means on the housing for releasably locking at least one of said rollers against rotation.

13. In an apparatus for cutting vegetation including a head member having an axis of rotation perpendicular to a cutting plane and further having an aperture adjacent its perimeter, driving means for rotating said head member about said axis, a flexible non-metallic line member in an uncoiled portion disposed at least partially within said head member and extending from said aperture into the cutting plane, the improvement comprising:
(a) storage spool means carrying a coiled portion of said line member and interconnected with the uncoiled portion of said line member disposed in said head member, said storage spool means mounted for rotation relatively to said head member; and
(b) actuator means controlling rotation of said storage spool means to uncoil selectively a portion of said line member and extend said line member from said aperture by a predetermined increment into the cutting plane during rotation of said head member.

14. In an apparatus for cutting vegetation and the like, including a head member having an axis of rotation perpendicular to a cutting plane, driving means for rotating said head member about said axis, a flexible non-metallic line member in an uncoiled portion disposed at least partially within said head member and extending from said head member via an aperture adjacent its periphery and into the cutting plane, a rotatable storage spool means carrying a coiled supply of said line member and interconnected with the uncoiled portion of said line member in said head member, the improvement comprising:
(a) first means for securing said spool means against rotation;
(b) second means for controlling said spool means for rotation through a certain angular displacement to extend only a predetermined increment of said line member from said head member into the cutting plane and then securing said spool means against rotation, and
(c) third means for actuating said second means during rotation of said head member.

15. An apparatus for cutting vegetation and the like comprising:
(a) a head member having an axis of rotation perpendicular to a cutting plane and further having an aperture adjacent its perimeter;
(b) driving means for rotating said head member about said axis;
(c) line storage means containing a coiled supply of flexible non-metallic line member;
(d) said flexible non-metallic line member disposed at least partially within said head member to extend through said aperture into the cutting plane;
(e) first means adapted for uncoiling said line member from said line storage means and feeding said line member through said head member and from said aperture into the cutting plane;
(f) second means for selectively changing said first means from a line member non-feeding condition into a line member feeding condition wherein said line member is uncoiled from said line storage means; and
(g) third means for returning said first means into the line member non-feeding condition only upon a predetermined increment of said line member being extended from said aperture during rotation of said head member.

16. The apparatus of claim 15 wherein said line storage means is a spool means carrying the coiled supply of said line member and said spool means is mounted for rotation relative to said head member to provide said first means to uncoil said line member and extend same from said aperture into the cutting plane.

17. The apparatus of claim 16 wherein said second means are gear means to secure said spool means against rotation in the line member non-feeding condition and to control rotation to a predetermined angular displacement of said spool member in the line member feeding condition.

18. The apparatus of claim 17 wherein said third means are said gear means for securing said spool means against rotation only upon a predetermined increment of said line member being extended from said aperture into the cutting plane.

19. An apparatus for cutting vegetation and the like, comprising:
(a) a head member arranged for rotation about an axis generally perpendicular with a cutting plane;
(b) driving means for rotating said head member;

(c) said head member having an aperture provided therein at a location spaced from the axis of rotation;

(d) a spool member carrying a coiled supply of a flexible non-metallic line member and mounted for uncoiling said line member;

(e) said line member extending from said spool member and disposed at least partially within said head member and extending through said aperture whereby uncoiling said line member extends same from said aperture into the cutting plane;

(f) first means for securing said line member against uncoiling on said spool member;

(g) second means for controlling the uncoiling of said line member carried on said spool member to a certain amount to extend only a predetermined increment of said line member from said head member into the cutting plane and then securing said line member carried on said spool member against uncoiling; and (h) third means for actuating said second means during rotation of said head member.

20. The apparatus of claim 19 wherein said spool member is mounted for rotation relative to said head member in uncoiling said line member and gear means provide for securing said spool member against unintended rotation and for controlling the uncoiling of said line member during rotation of said spool member.

21. The apparatus of claim 20 wherein said gear means secure said spool member against rotation after only a predetermined increment of line member is extended from said aperture into the cutting plane during rotation of said head member.

22. The apparatus of claim 19 wherein said third means is a mechanism shifted between first and second positions for actuating said second means.

23. The apparatus of claim 22 wherein said mechanism is an actuator moved by a hand of the apparatus user.

24. An apparatus for cutting vegetation and the like, comprising:

(a) a head member having an axis of rotation perpendicular to a cutting plane and further having an aperture adjacent its perimeter, (b) driving means for rotating said head member about said axis, (c) a flexible non-metallic line member disposed at least partially within said head member, and (d) feed means to uncoil selectively a portion of said line member during rotation of said head member and for dispensing said line member from said aperture into said cutting plane during the cutting of vegetation.

25. The apparatus of claim 24 wherein said feed means dispenses a predetermined increment of said line member into the cutting plane.

26. The apparatus of claim 25 wherein said feed control means controls uncoiling of said line member from a spool member carrying a coiled supply of said line member.

27. The apparatus of claim 24 wherein a rotatable storage spool means carries a coiled supply of said line member, and said feed means controls rotation of said spool means for dispensing a predetermined increment of said line member into the cutting plane.

28. Apparatus for cutting vegetation and the like, comprising:

(a) a rotatable head member having a tubular member extending therethrough between a first point at its periphery and a second point adjacent one end of the axis of said head member;

(b) driving means having a hollow rotatable shaft member fixedly interconnected with said tubular member at said point along said axis thereof;

(c) a flexible non-metallic line member having a coiled portion positioned independently of said rotation of said head member and an unwound portion extending through said hollow shaft member and said tubular member to said periphery of said head member to provide a free-traveling cutting end arcuately movable in a cutting plane defined by said rotatable head member; and (d) feed means for selectively unwinding additional predetermined incremental lengths of said line member for extension from said periphery of said head member during rotation thereof and for anchoring said line member against being drawn from said head member during the cutting of vegetation.

29. In an apparatus for cutting vegetation and the like, including a head member having an axis of rotation perpendicular to a cutting plane, driving means for rotating said head member about said axis, a flexible non-metallic line member in an uncoiled portion disposed at least partially within said head member and extending from said head member via an aperture adjacent its periphery and into the cutting plane, a rotatable storage spool means carrying a coiled supply of said line member and interconnected with the uncoiled portion of said line member in said head member, the improvement comprising:

(a) first means for maintaining said spool means against rotation;

(b) second means for controlling said spool means for rotation through a certain angular displacement to extend only a predetermined increment of said line member from said head member into the cutting plane and then maintaining said spool means against rotation, and (c) third means for actuating said second means during rotation of said head member.

30. The apparatus of claim 29 wherein said second means are gear means to maintain said spool means against rotation in the line member non-feeding condition and to control rotation to a predetermined angular displacement of said spool member in the line member feeding condition.

31. The apparatus of claim 30 wherein said third means are said gear means for maintaining said spool means against rotation only upon a predetermined increment of said line member being extended from said aperture into the cutting plane.

32. An apparatus for cutting vegetation and the like, comprising:

(a) a head member arranged for rotation about an axis generally perpendicular with a cutting plane;

(b) driving means for rotating said head member;

(c) said head member having an aperture provided therein at a location spaced from the axis of rotation;

(d) a spool member carrying a coiled supply of a flexible non-metallic line member and mounted for uncoiling said line member;

(e) said line member extending from said spool member and disposed at least partially within said head member and extending through said aperture whereby uncoiling said line member extends same from said aperture into the cutting plane;
(f) first means for maintaining said line member against uncoiling on said spool member;
(g) second means for controlling the uncoiling of said line member carried on said spool member to a certain amount to extend only a predetermined increment of said line member from said head member into the cutting plane and then maintaining said line member carried on said spool member against uncoiling; and
(h) third means for actuating said second means during rotation of said head member.

33. The apparatus of claim 32 wherein said spool member is mounted for rotation relative to said head member in uncoiling said line member and gear means provide for maintaining said spool member against unintended rotation and for controlling the uncoiling of said line member during rotation of said spool member.

34. The apparatus of claim 33 wherein said gear means maintain said spool member against rotation after only a predetermined increment of line member is extended from said aperture into the cutting plane during rotation of said head member.

35. The apparatus of claim 32 wherein said third means is a mechanism shifted between first and second positions for actuating said second means.

36. The apparatus of claim 35 wherein said mechanism is an actuator moved by a hand of the appratus user.

* * * * *